US007089159B2

(12) United States Patent
Hachiya (10) Patent No.: US 7,089,159 B2
(45) Date of Patent: Aug. 8, 2006

(54) METHOD AND APPARATUS FOR MATRIX REORDERING AND ELECTRONIC CIRCUIT SIMULATION

(75) Inventor: Koutaro Hachiya, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 743 days.

(21) Appl. No.: 09/822,512

(22) Filed: Apr. 2, 2001

(65) Prior Publication Data

US 2001/0029441 A1    Oct. 11, 2001

(30) Foreign Application Priority Data

Apr. 4, 2000    (JP)    ............................ P2000-102163

(51) Int. Cl.
*G06F 7/10*    (2006.01)
(52) U.S. Cl. .............................. 703/2; 703/13; 703/14; 702/196; 708/514; 708/520; 345/644
(58) Field of Classification Search .................... 703/2, 703/13, 14; 708/502, 446; 712/17; 716/7
See application file for complete search history.

(56) References Cited

U.S. PATENT DOCUMENTS

| 5,604,911 | A | * | 2/1997 | Ushiro ........................... 703/2 |
| 5,655,137 | A | * | 8/1997 | Kevorkian ................... 712/17 |
| 5,819,073 | A | * | 10/1998 | Nakamura ................... 716/20 |
| 6,031,979 | A | * | 2/2000 | Hachiya ........................ 716/7 |

(Continued)

FOREIGN PATENT DOCUMENTS

JP    6-290204 A    10/1994

(Continued)

OTHER PUBLICATIONS

"A New Matrix Solution Technique for General Circuit Simualtin", R. Burch, IEEE Transactions on Computer Aided Design of IC's, vol. 12, No. 2, Feb. 1993.*

(Continued)

*Primary Examiner*—Fred Ferris
(74) *Attorney, Agent, or Firm*—Sughrue Mion, PLLC (57) ABSTRACT

A matrix reordering method performs reordering of elements of a coefficient matrix created based on coefficients of linear simultaneous equations whose solutions are to be produced by parallel processing of processors of a computer in accordance with Gaussian elimination. Herein, degrees corresponding to numbers of non-zero elements are calculated with respect to all pivots included in the coefficient matrix. Then, a first pivot whose degree is under a threshold (mindeg+α) is selected from among the pivots of the coefficient matrix, while a second pivot whose critical path length is minimum is also selected from among the pivots of the coefficient matrix. Replacement of elements is performed between the first pivot and second pivot to complete reordering with respect to the first pivot. In addition, non-zero elements, which are newly produced by the Gaussian elimination of the first pivot, are added to the coefficient matrix. If a degree or a parameter of the first pivot is under a threshold (β), reordering is performed on a partial matrix whose elements are not eliminated and are selected from among the elements of the coefficient matrix in accordance with the nested dissection method, so that non-zero elements, which are newly produced by the Gaussian elimination of the partial matrix, are added to the coefficient matrix. Because the critical path length can be reduced as compared with conventional techniques, it is possible to considerably reduce a total processing time of the parallel processing to secure high-speed performance of the Gaussian elimination.

16 Claims, 9 Drawing Sheets

U.S. PATENT DOCUMENTS

| | | | |
|---|---|---|---|
| 6,144,932 A * | 11/2000 | Hachiya | 703/14 |
| 6,360,190 B1 * | 3/2002 | Kumashiro | 703/14 |
| 6,397,236 B1 * | 5/2002 | Garg et al. | 708/446 |
| 6,470,368 B1 * | 10/2002 | Garg et al. | 708/446 |
| 6,601,080 B1 * | 7/2003 | Garg | 708/502 |
| 6,636,828 B1 * | 10/2003 | Hachiya | 703/2 |
| 6,768,976 B1 * | 7/2004 | Homma et al. | 703/14 |

FOREIGN PATENT DOCUMENTS

| | | |
|---|---|---|
| JP | H7-129637 | 5/1995 |
| JP | 8-508838 A | 9/1996 |
| JP | 8-297654 A | 11/1996 |
| JP | 9-319784 A | 12/1997 |
| JP | H10-11475 | 1/1998 |
| JP | 10-334129 A | 12/1998 |
| JP | 11-328155 A | 11/1999 |
| JP | 1 143 346 A2 * | 3/2001 |

OTHER PUBLICATIONS

"Parallel Programming with Control Abstraction", L.A. Crowl, ACM transactions on Prog. Lang., vol. 16, No. 3, May 1994.*

"On Efficient Band Matrix Arithmetic", W. Eberly, IEEE 0-8186-2900-2/92, IEEE 1992.*

Dr. T. Kokuni, Matrix Calculation Software, pp. 140-143, Maruzen Publishing Co., Japan.

Hironori Kasahara et al., Parallel Processing of Direct Solution Method for Unstructured Sparse Matrices on OSCAR, Journal of the Information Processing Society of Japan, Apr. 1992, pp. 438-447, vol. 33, No. 4.

* cited by examiner

```
for k=1:n-1                    ELIMINATE
                               k-th UNKNOWN
    for i=k+1:n
        if a(i,k)<>0 then      DIVISION
            a(i,k)=a(i,k)/a(k,k)
            for j=k+1:n                MULTIPLICATION
                if a(k,j)<>0 then
                    a(i,j)=a(i,j)-a(i,k)a(k,j)
                end
            end
        end
    end
end
```

FIG. 6

$$\begin{bmatrix} ④ & \times & & F \\ \times & ⑤ & \times & \\ & \times & ⑥ & \times \\ F & & \times & ② \end{bmatrix}$$

× : NON-ZERO ELEMENTS
○ : NON-ZERO ELEMENTS
    (NUMBERS IN CIRCLES REPRESENT
    NUMBERS OF PIVOTS BEFORE
    REORDERING)
BLANK : ZERO ELEMENTS
F : NON-ZERO ELEMENTS ADDED

× : NON-ZERO ELEMENTS
○ : NON-ZERO ELEMENTS
(NUMBERS IN CIRCLES REPRESENT NUMBERS OF PIVOTS BEFORE REORDERING)
BLANK : ZERO ELEMENTS

CRITICAL PATH
(CRITICAL PATH LENGTH=20, WEIGHT SUM=24)

FIG. 17

METHOD AND APPARATUS FOR MATRIX REORDERING AND ELECTRONIC CIRCUIT SIMULATION

BACKGROUND OF THE INVENTION

1. Field of the Invention

This invention relates to methods and apparatuses for matrix reordering that is preferable for use in determination of orders of coefficient matrices of linear simultaneous equations. This invention also relates to methods and apparatuses for electronic circuit simulation using the matrix reordering.

2. Description of the Related Art

Conventionally, there are provided system simulation methods that use computers to describe elements constructing the system as linear simultaneous equations, which are repeatedly resolved to analyze operations of the system. Gaussian elimination is frequently used in the system simulation methods and is known as one of methods for obtaining solutions of the linear simultaneous equations. The Gaussian elimination produces solutions by an advance elimination process and a back-substitution process with respect to a matrix of n×n+1, which is formed by linearly arranging constant terms and coefficient matrices representing coefficients for n unknowns of linear simultaneous equations, for example. The advance elimination process is effected to transform the matrix of n×n+1 to an upper triangular matrix, while the back-substitution process is effected to sequentially produce solutions for the transformed matrix from its last row. Matrix reordering or matrix ordering is known as the technique for reordering elements (particularly, non-zero elements) of the coefficient matrices representing coefficients of the simultaneous equations in accordance with prescribed rules. Using the matrix reordering, it is possible to reduce a number of times for performing calculations such as multiplication and division that are needed for producing solutions to the linear simultaneous equations.

Figure 14:
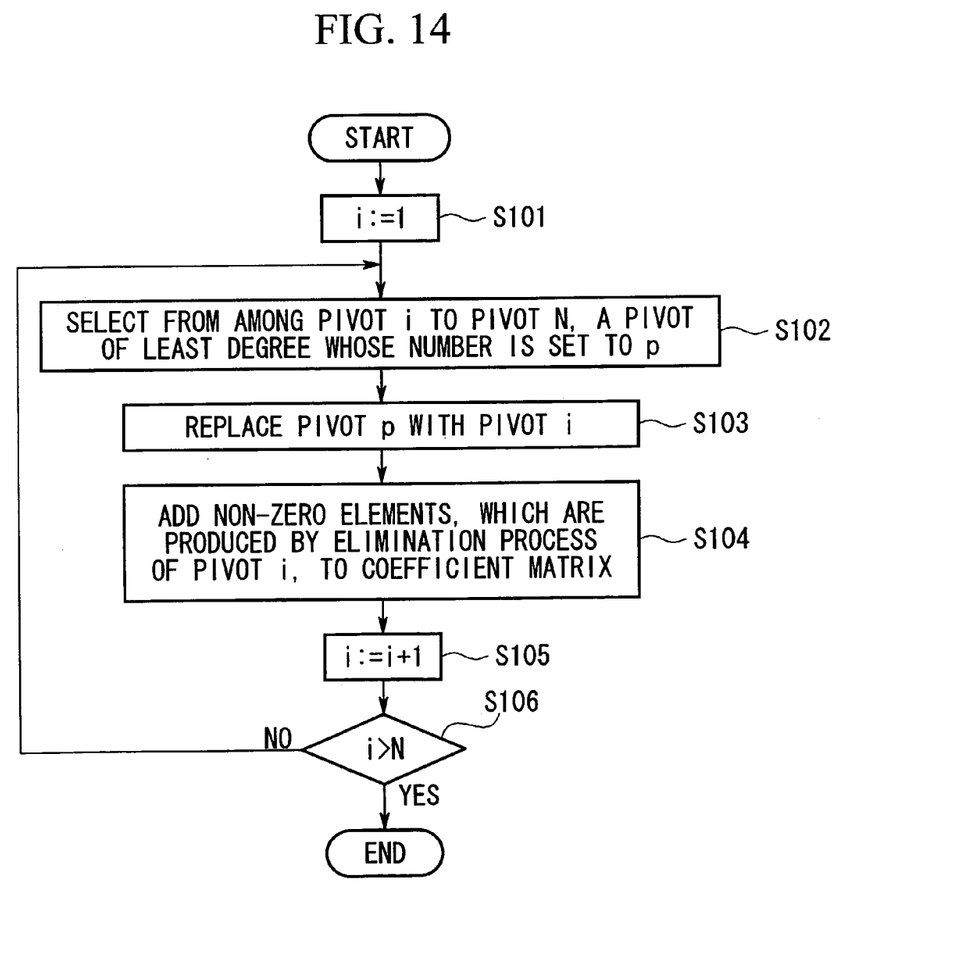
FIG. 14 is a flowchart showing a conventional matrix reordering process in accordance with the minimum degree method.

FIG. 14 shows a flow of processes of the conventional matrix reordering for use in the electronic circuit simulation system. In general, the conventional matrix reordering employ the prescribed method called "minimum (or least) degree method". This is shown by a book entitled "Matrix Calculation Software" that is written and edited by Dr. Tikara Kokuni and is published by Maruzen Co., Ltd. in Japan. The flow of FIG. 14 is provided for reordering elements of a coefficient matrix of n×n. In step S101, a variable is set to '1'. In step S102, a pivot having a minimum degree is selected from among pivots that are not determined in order within a given coefficient matrix, then, a number of the selected pivot is set to a variable p. The coefficient matrix contains a number of pivots, wherein pivot k (where k is an integer ranging from 1 to N) designates a combination of elements of row k and elements of column k. In addition, the degree is defined as a number of non-zero elements that are contained in a plot from which elements on a diagonal line are excluded, wherein the non-zero elements counted for the degree are arranged in a lower side of the diagonal line in a column direction and in a right side of the diagonal line in a row direction. The pivot having a minimum degree is selected from among pivots whose numbers are counted from i. In step S103, new pivot i is determined by replacing its original pivot i with the selected pivot p. In step S104, non-zero elements that are produced by effecting Gaussian elimination on pivot i are added to the coefficient matrix. Replacement between pivots p and i is to interchange all elements of row p and all elements of row i and to interchange all elements of column p and all elements of column i. That is, replacement is effected simultaneously on rows and columns of pivots. A series of processes described above are repeatedly performed until all pivots are to be completely determined in order, which is shown by steps S105 and S106 in FIG. 14. According to the minimum degree method, pivots each having a small number of non-zero elements are reordered toward an upper side within the coefficient matrix. This allows reduction of a total number of calculations such as multiplication and division in the Gaussian elimination.

Using the coefficient matrix whose elements are reordered in accordance with the conventional matrix reordering method, parallel processing is executed on the Gaussian elimination process by using multiple processors in parallel. As compared with successive processing using a single processor, the parallel processing using the multiple processors does not always sufficiently increase the processing speed thereof. Because, in the Gaussian elimination process, an operational process (or calculation) for a certain row is made with reference to result of an operational process effected on another row. In the parallel processing of the Gaussian elimination process, operational processes (or calculations) are respectively made by units of rows and are performed in parallel by the multiple processors. To achieve high-speed performance of the Gaussian elimination process, it is necessary to consider several points in advance. A first point is to reduce a total number of operational processes that are effected in the parallel processing of the Gaussian elimination process. A second point is to reduce a number of operational processes that are effected on each of the rows. As for a first row, for example, its operational process is made with reference to result of an operational process of a second row, which is also made with reference to result of an operational process of a third row. Hence, it is necessary to count all of the aforementioned operational processes that are involved into the operational process being effected on each row. Although the aforementioned points are very important, the conventional matrix reordering is made in consideration of only the reduction of the total number of operational processes being effected in the Gaussian elimination process. Therefore, the conventional matrix reordering do not always contribute to high-speed performance in the parallel processing of the Gaussian elimination process.

SUMMARY OF THE INVENTION

It is an object of the invention to provide a method and an apparatus for matrix reordering that is improved in high-speed performance, particularly in parallel processing of the Gaussian elimination process using multiple processors.

It is another object of the invention to provide a method and an apparatus for electronic circuit simulation that use the matrix reordering improved in high-speed performance.

A matrix reordering method performs reordering of elements of a coefficient matrix created based on coefficients of linear simultaneous equations whose solutions are to be produced by parallel processing of processors of a computer in accordance with Gaussian elimination. Herein, degrees corresponding to numbers of non-zero elements are calculated with respect to all pivots included in the coefficient matrix. Then, a first pivot whose degree is under a threshold (mindeg+α) is selected from among the pivots of the coefficient matrix, while a second pivot whose critical path length is minimum is also selected from among the pivots of the coefficient matrix. Replacement of elements is performed between the first pivot and second pivot to complete reordering with respect to the first pivot. In addition, non-zero elements, which are newly produced by the Gaussian elimination of the first pivot, are added to the coefficient matrix. If a degree or a parameter of the first pivot is under a threshold (β), reordering is performed on a partial matrix whose elements are not eliminated and are selected from among the elements of the coefficient matrix in accordance with the nested dissection method, so that non-zero elements, which are newly produced by the Gaussian elimination of the partial matrix, are added to the coefficient matrix.

If the coefficient matrix is given as a non-symmetric matrix, a symmetric matrix is created prior to the reordering by transposition. Then, the reordering is performed on the symmetric matrix.

Because the critical path length can be reduced as compared with the conventional technique, it is possible to considerably reduce a total processing time of the parallel processing to secure high-speed performance of the Gaussian elimination.

In the case of the electronic circuit simulation, the coefficient matrix is created using coefficients corresponding to nodes by which electronic components of a given electronic circuit are connected.

BRIEF DESCRIPTION OF THE DRAWINGS

These and other objects, aspects and embodiments of the present invention will be described in more detail with reference to the following drawing figures, of which.

DESCRIPTION OF THE PREFERRED EMBODIMENTS

This invention will be described in further detail by way of examples with reference to the accompanying drawings.

Figure 1:
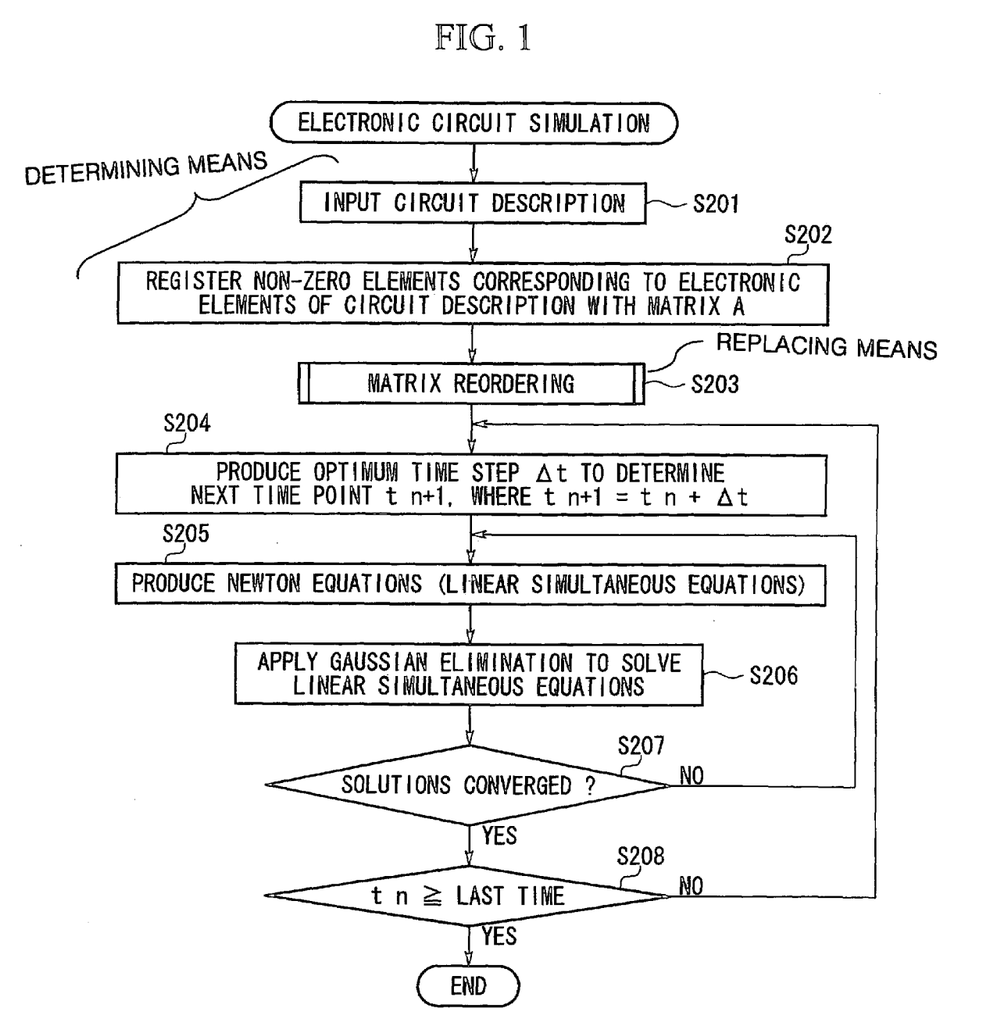
FIG. 1 is a flowchart showing an electronic circuit simulation method using matrix reordering in accordance with an embodiment of the invention.

FIG. 1 shows an overall flow of steps for an electronic circuit simulation method using matrix reordering in accordance with an embodiment of the invention. The above method is applied to an electronic circuit simulation system that is actualized by a computer and its software programs. Namely, the computer uses multiple processors that operate in parallel to produce solutions of linear simultaneous equations in accordance with the software programs. The software programs are provided or distributed by computer-readable storage media or by computer networks.

Using an input device (not shown), the system inputs circuit description of an electronic circuit that is a subject of simulation in step S201. The electronic circuit contains electronic elements, each of which is expressed by a linear equation. Hence, there are provided linear simultaneous equations with respect to all electronic elements contained in the electronic circuit. In step S202, positions of non-zero elements selected from among coefficients of the linear simultaneous equations are registered with a matrix A. If the electronic circuit is expressed by linear simultaneous equations of N unknowns, the matrix A is made as 'N rows×N columns'. In step S202, coefficients of the simultaneous equations are set to elements of the matrix A. In step S203, the system performs a matrix reordering process in which using matrix structure information representing values of elements of the matrix A, the system performs replacement between rows and columns in arrangement of elements of the matrix A. Herein, an order of the matrix A is determined to minimize a processing time of step S206 regarding a solving process of linear simultaneous equations. In general, a combination of elements of row i and elements of column i is called 'pivot i'. So, the step S203 proceeds to rearrangement of pivots contained in the matrix A. Namely, arrangement of elements of the matrix A is completely changed by simultaneous replacement between rows and columns in the matrix A.

Next, the flow proceeds to step S204 in which the system produces an optimum time step Δt for the electronic circuit simulation. So, the system sequentially determines time points by using the time step Δt. For example, a next time point tn+1 is determined using Δt from a present time tn, where tn+1=tn+Δt. In step S203, the system provides matrix structure information representing new arrangement of rows and columns of the matrix A on which rearrangement of elements is completed. Based on the matrix structure information, non-linear characteristics of the electronic elements at a given time are linearized to create Newton equations (namely, linear simultaneous equations) in step S205.

In step S206, the system uses Gaussian elimination processes to solve the Newton equations that are created in the step S205. Concretely speaking, the system operates multiple processors in parallel to solve the Newton equations using the Gaussian elimination processes. In step S207, a decision is made as to whether solutions to the Newton equations are converged or not. If not converged, the flow returns to step S205 in which the system re-creates Newton equations, then, the flow proceeds to the solving process of step S206. If the solutions are converged, the flow proceeds to step S208 in which a decision is made as to whether a present time tn reaches a last time or not. If so, in other words, if tn≧(last time), the system outputs calculation results. If the present time tn does not reach the last time, the system updates tn by tn+1, then, the flow proceeds to step S204. So, the system repeatedly performs a series of steps S204 to S207.

The aforementioned electronic circuit simulation method is disclosed by various papers and documents such as Japanese Patent Unexamined Publication No. Hei 10-11475 and Japanese Patent Unexamined Publication No. Hei 7-129637, each of which is entitled "Circuit Simulation Method", for example.

Figure 11:
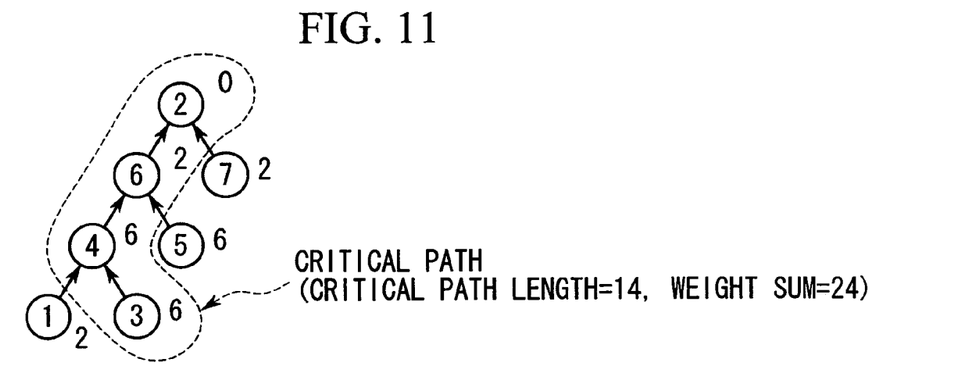
FIG. 11 shows a task graph designating a critical path that is established based on the reordered matrix of FIG. 10.

The Gaussian elimination process of step S206 can be regarded as one kind of successive elimination in which unknowns of simultaneous equations are successively eliminated one by one. Herein, a process for eliminating one variable is defined as a task. There exists some restriction among tasks in execution order. Such restriction can be represented by a digraph, which is called a "task graph" shown in FIG. 11. For example, there is a restriction in which task i should be executed after completion of task j. In the task graph of FIG. 11, such a restriction is translated into existence of a edge that directs from a vertex j to a vertex i. FIG. 11 shows a number of vertices, each of which is represented by a certain integral number encompassed by a circle. In addition, edges are shown by arrows, each of which represents a direction from one vertex to another vertex. Further, the processing time that is required for completion of the task is given as a weight for the task. Such a weight is shown by an integral number that is described in proximity to the vertex corresponding to the task.

Among paths each of which lies from one vertex to another in the task graph, a longest path is called a critical path. The parallel processing time of the Gaussian elimination process of step S206 depends upon a length of the critical path, which is a sum of weights of all vertices contained in the path. Therefore, the present embodiment performs the matrix reordering process (see step S203) such as to reduce the length of the critical path as short as possible.

Figure 6:
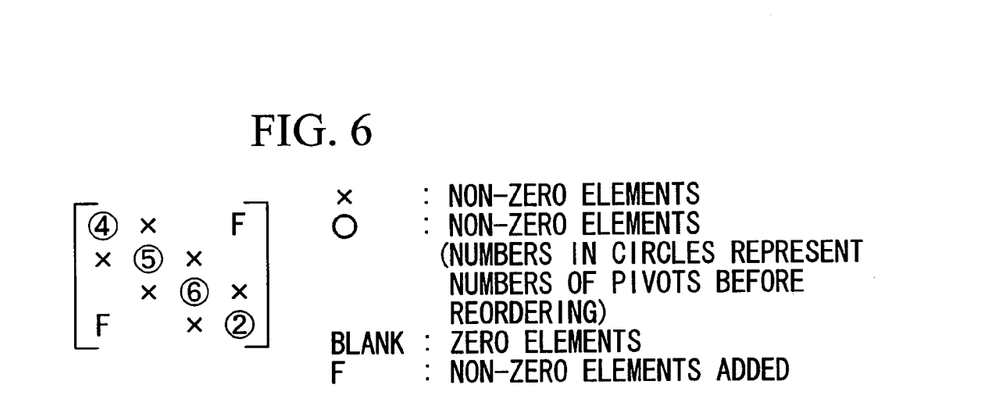
FIG. 6 shows an example of a partial matrix whose elements have not been reordered yet.

Next, brief descriptions will be given with respect to "matrix graphs", "degrees of pivots" and "critical paths of pivots", which are required for explaining the matrix reordering process shown in FIG. 1. The matrix graph is a non-directed graph in which an edge exists between vertices i and j only when an element a (i,j) that lies in row i and column j of the matrix A is not zero. For example, a matrix of FIG. 6 is translated into a matrix graph of FIG. 7. Generally speaking, a term "degree" denotes a number of edges connected to a vertex in a graph. In the case of the matrix graph, each vertex corresponds to a pivot, hence, a degree of the vertex is called a degree of the pivot. In the matrix of FIG. 6, non-zero elements are denoted by marks X and O. Concretely speaking, numbers encompassed by circles, which are arranged on a diagonal line in the matrix, denote numbers of pivots which are originally designated prior to the matrix reordering. In addition, blank positions represent zero elements, while a symbol 'F' denotes a non-zero element that is added by the Gaussian elimination process (see step S206) with respect to each pivot.

Suppose that during the matrix reordering of a square matrix of N×N, pivots 1 to i are determined in order (or rearranged in position) while other pivots i+1 to N are not determined in order. In that case, it is possible to perform the Gaussian elimination process for eliminating variables 1 to i. That is, it is possible to create a task graph containing i tasks ranging from task 1 to task i. In the task graph, a longest path is selected from among paths reaching task k and is called a critical path of task k, which can be also called a critical path of pivot k. In addition, a sum of weights of all vertices contained in the critical path of task k is called a critical path length of task k or pivot k.

Figure 2:
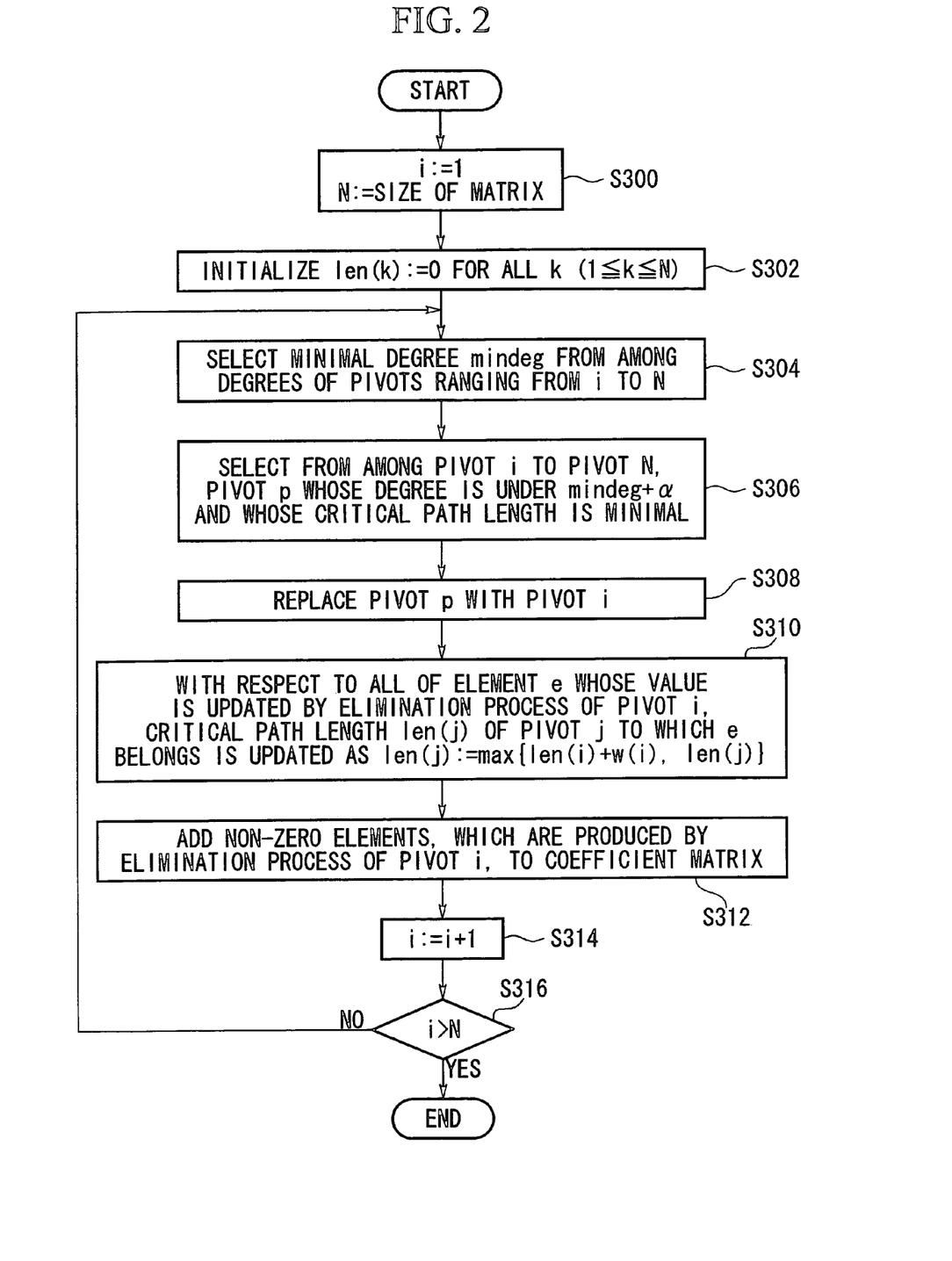
FIG. 2 is a flowchart showing details of a matrix reordering process contained in the electronic circuit simulation method shown in FIG. 1.

FIG. 2 shows a flow of the matrix reordering process, which is performed in step S203 of the electronic circuit simulation method shown in FIG. 1. In step S300, a variable i is set to '1' while a variable N is used to designage a size of the matrix A. In step S302, initialization is performed on array variable len(k) as len(k):=0 with respect to all variables k (where 1≦k≦N). Herein, the array variable len(k) stores a critical path length of pivot k that varies at each time point. In step S304, a minimum degree mindeg is detected from among degrees of pivots i to N. In step S306, pivot p whose degree is under mindeg+α and whose critical path length is minimum is selected from among the pivots i to N. Herein, α is a constant value that is zero or more. Recommended values being selected for α range from '1' to '3'. Therefore, content of the step S306 is summarized such that one pivot or plural pivots each having an approximate minimum degree within a prescribed range counted from the minimum degree mindeg are examined to extract a single pivot p having a minimum (or shortest) critical path length. In step S308, replacement is performed between pivots p and i.

Next, the system picks up all elements (each denoted by 'e') whose values are updated by the elimination process of pivot i after the aforementioned replacement. In step S310, a critical path length len(j) of pivot j to which the element e belongs are updated as len(j):=max{len(i)+w(i), len(j)}. That is, critical path lengths of pivots that are influenced by the replacement (see step S308) between pivots p and i are updated by newest values in step S310. Herein, max(x,y) is a function for selecting bigger one of variables x and y. In step S312, non-zero elements that are produced by the elimination process of pivot i are added to the matrix A. In step S314, the variable i is updated by adding '1' thereto. In step S316, a decision is made as to whether the variable i exceeds a variable N or not. Until the variable i exceeds the variable N, a series of steps S304 to S312 are repeatedly performed. Thus, the matrix reordering process is completed with respect to all pivots contained in the square matrix of N×N.

In the above, w(i) is described as a function to provide weight (or processing time) of pivot i. The function w(i) can be defined as an operation to obtain a total number of calculations such as multiplication and division, which are effected in the Gaussian elimination process of pivot i in step S206 shown in FIG. 1.

Figure 5:
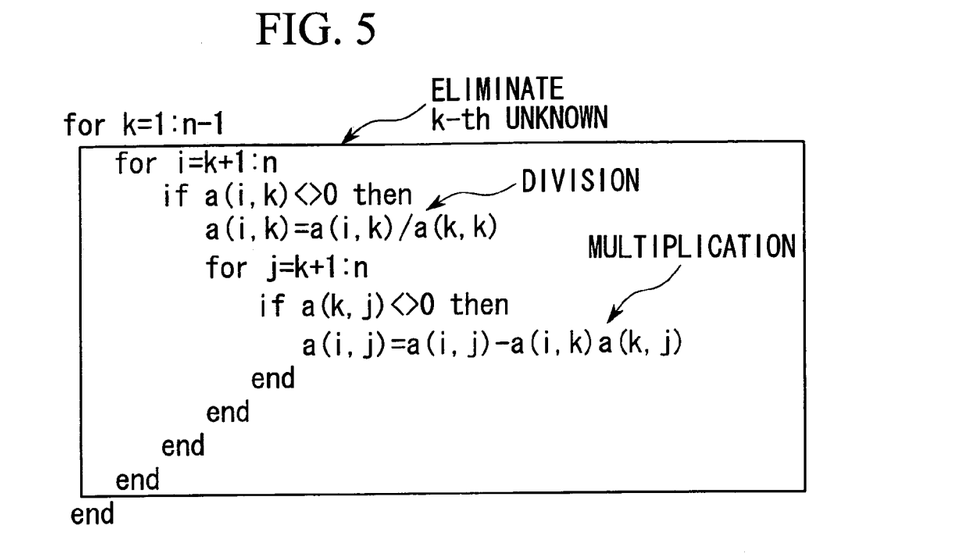
FIG. 5 shows a part of a program that describes a calculation method of a Gaussian elimination process contained in the electronic circuit simulation method of FIG. 1.

Suppose that the Gaussian elimination process is performed in accordance with a program shown in FIG. 5, wherein it is possible to generalize calculation of w(i) as w(i)=(deg(i)+1)·deg(i). That is, in an elimination process of variable k, weight w(k) is defined as a result of calculations in which a degree of pivot k (i.e., deg(k)) is added with '1' and is then multiplied by deg(k), namely w(k)=(deg(k)+1)·deg(k). There are various kinds of description methods for describing programs of the Gaussian elimination process. If a different program is described for the Gaussian elimination process, it is necessary to adequately change the function w(i) to reflect the processing time defined by the different description of the program.

Figure 3:
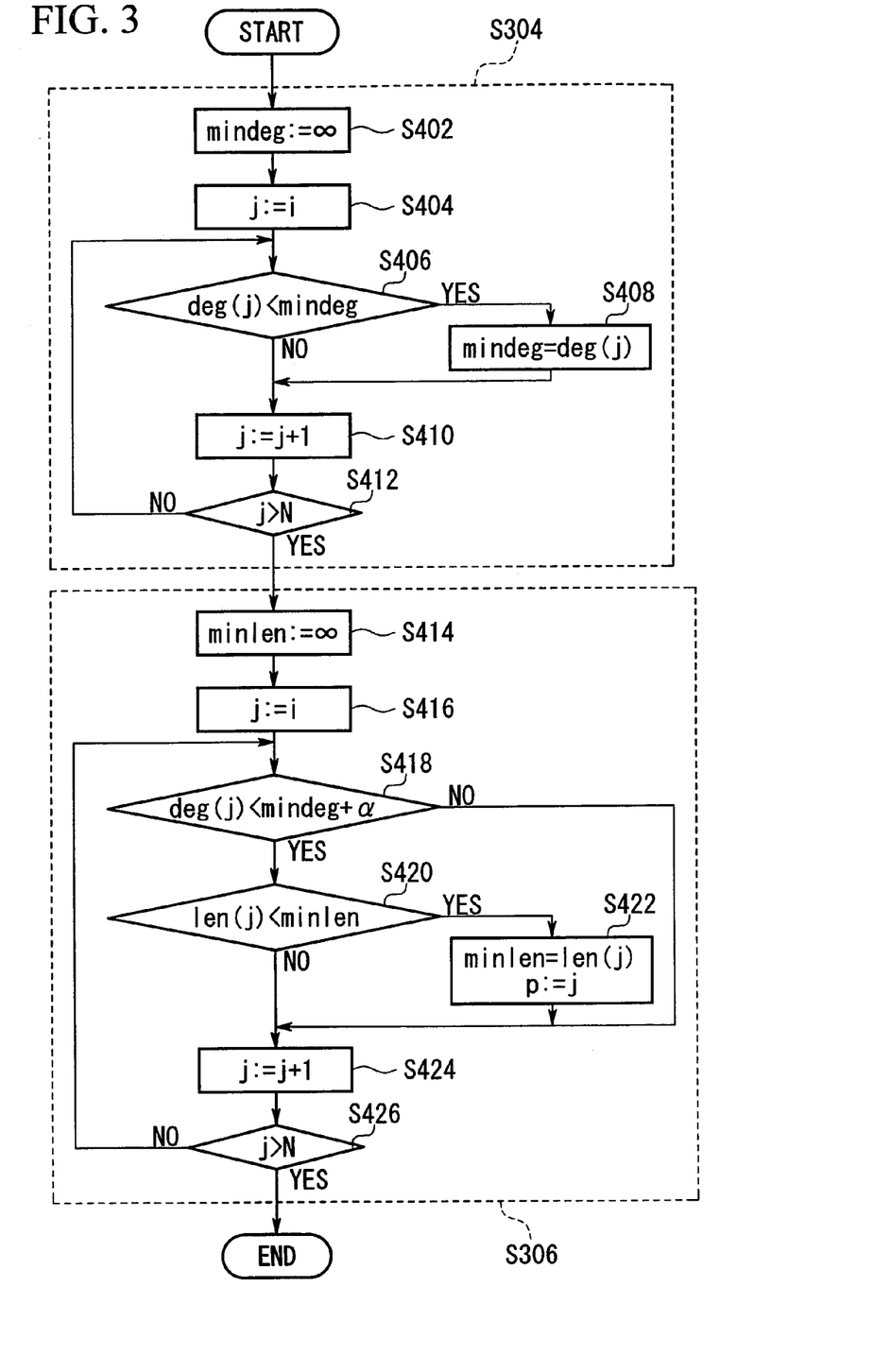
FIG. 3 is a flowchart showing details of selected steps in FIG. 2.

Next, detailed contents of the steps S304 and S306 shown in FIG. 2 will be described with reference to FIG. 3. That is, FIG. 3 shows a flow of steps corresponding to details of the steps S304 and S306, wherein steps S402 to S412 correspond to the step S304 while steps S414 to S426 correspond to the step S306. In step S402, initialization is performed on a variable mindeg storing a minimum degree. In step S404, a variable j is set to a variable i. Then, a series of steps S406 to S412 are repeatedly performed until the variable j reaches a variable N. Specifically, in step S406, a decision is made as to whether a degree of pivot j (deg(j)) is smaller than the variable mindeg or not. If so, the flow proceeds to step S408 in which the variable mindeg is updated by the degree deg(j). In step S410, the variable j is increased by '1', namely j:=j+1. In step S412, a decision is made as to whether the increased variable j is greater than the variable N or not. If not, the flow returns to step S406, so that a series of steps S406 to S412 are to be performed again. Due to the aforementioned steps of the step S304, a minimum degree is stored in the variable mindeg.

In the step S306 shown in FIG. 3, initialization is performed on a variable minlen that stores a minimum critical path length in step S414. In step S416, the variable j is set to the variable i. Then, a series of steps S418 to S426 are repeatedly performed until the variable j reaches the variable N. Specifically, in step S418, a decision is made as to whether the degree of pivot j (deg(j)) is smaller than mindeg+α or not. If so, the flow proceeds to step S420 in which a decision is made as to whether a critical path length of pivot j (len(j)) is smaller than the variable minlen or not. If so, the flow proceeds to step S422 in which the variable minlen is updated by the critical path length len(j), and a variable p is set to the variable j. After at least one of the steps S418 to S422 is completed, the flow proceeds to step S424 in which the variable j is increased by '1', namely j:=j+1. In step S426, a decision is made as to whether the variable j is greater than the variable N or not. If not, the flow returns to step S418, so that a series of steps S418 to S426 are to be performed again. Due to the aforementioned steps of the step S306, the variable p stores a number of a pivot whose degree is under mindeg+α and whose critical path length is minimum. In addition, the variable minlen stores the minimum critical path length.

Figure 8:
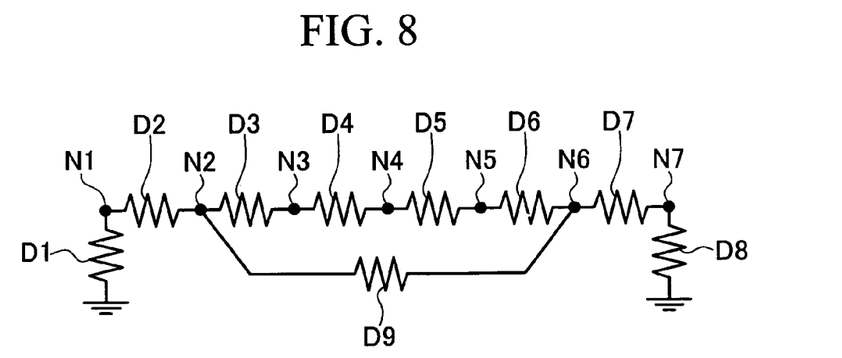
FIG. 8 is a circuit diagram showing an electronic circuit in which electronic elements are connected together by way of nodes.
Figure 9:
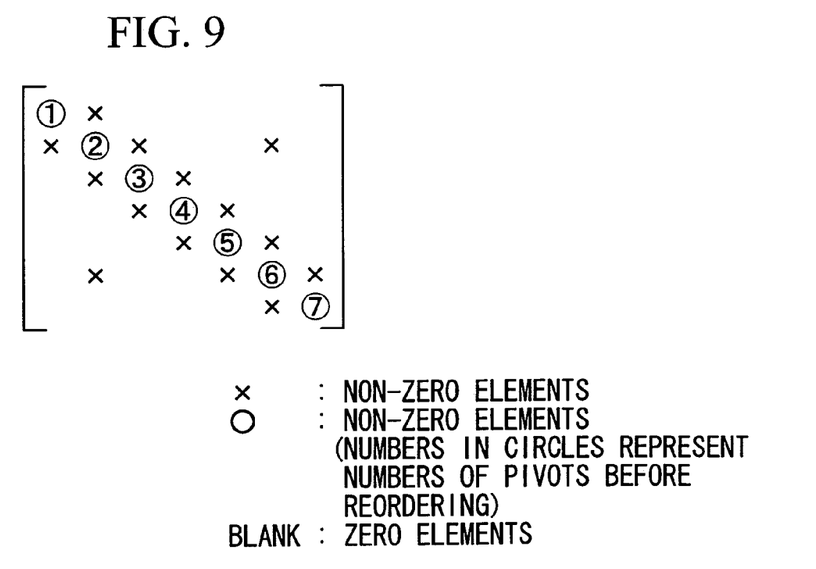
FIG. 9 shows a coefficient matrix whose elements are configured and arranged in connection with the nodes of the electronic circuit.
Figure 10:
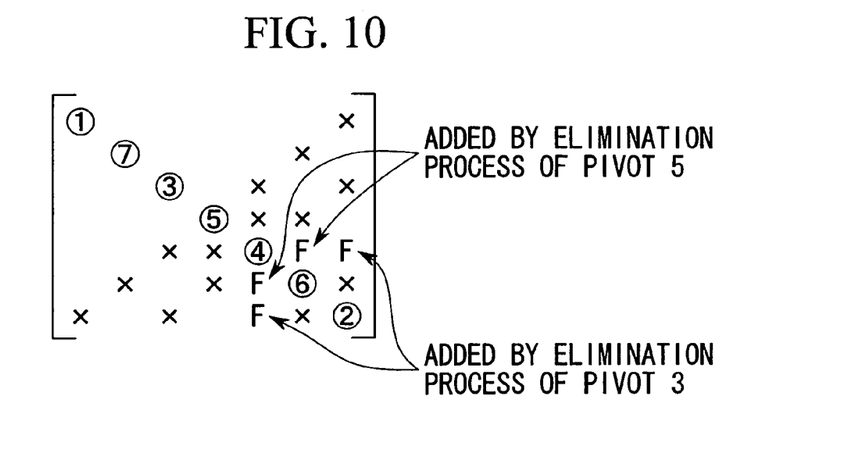
FIG. 10 shows a reordered matrix that is created by reordering elements of the coefficient matrix of FIG. 9 in accordance with the matrix reordering process of FIG. 2.

Next, a concrete example of the matrix reordering process, which is shown in step S203 of FIG. 1 and details of which are shown in FIG. 2, will be described with reference to FIGS. 8 to 11. FIG. 8 shows an example of an electronic circuit to be simulated. FIG. 9 shows an example of a coefficient matrix representing simultaneous equations corresponding to the electronic circuit. FIG. 10 shows an example of a reordered matrix that is created by effecting matrix reordering on the coefficient matrix of FIG. 9. FIG. 11 shows a task graph representing the reordered matrix of FIG. 10.

That is, FIG. 8 shows an electronic circuit that is configured by nine electronic elements D1 to D9, which are connected together via seven nodes N1 to N7. Herein, voltage variations of the nodes N1 to N7 are represented by variables, by which linear simultaneous equations are created. FIG. 9 shows a coefficient matrix that represents the linear simultaneous equations with respect to the seven variables. The coefficient matrix contains a certain number of pivots, wherein pivot i is configured to cope with a node number i. In the coefficient matrix of FIG. 9, non-zero elements are designated by marks X, and zero elements are located at blank positions. For convenience' sake, numbers of the elements are omitted in the coefficient matrix of FIG. 9. In addition, marks ○ also designate non-zero elements, wherein integral numbers encompassed by circles designate numbers of pivots before matrix reordering. Weight w(i) for a Gaussian elimination process of a variable i (namely, task i) is produced by multiplication between '(a degree of pivot i)+1' and 'a degree of pivot i', namely w(i)=(deg(i)+1)·deg(i). The following description is made under a prescribed condition where α=0.

In step S300 of FIG. 2, a variable i is set to '1'. Herein, pivot i is determined as a pivot whose degree is minimum (where α=0). Then, the system searches a pivot whose critical path length is minimum. In FIG. 9, all of pivots 1 to 7 have a minimum degree '1' and a minimum critical path length '2'. Among those pivots 1–7, the system chooses pivot 1 whose number is the smallest. Hence, a variable p is set to '1' in step S306. Because of i=p, the system does not actually perform replacement of pivots in step S308. Even if a Gaussian elimination process is performed on the pivot 1, non-zero elements are not newly produced (see step S312).

If i=3, pivot 3 having a minimum degree '2' and a minimum critical path length '6' is selected, so that the variable p is set to '3'. By elimination of the pivot 3, non-zero elements a(4,7) and a(7,4) are newly produced and are added to the matrix in step S312.

If i=4, pivot 5 having a minimum degree '2' and a minimum critical path length '6' is selected, so that the variable p is set to '5'. By elimination of the pivot 5, non-zero elements a(4,6) and a(6,4) are newly produced and are added to the matrix in step S312.

If i=5, pivot 4 having a minimum degree '2' and a minimum critical path length '12' (=6+6) is selected, so that the variable p is set to '4'. By elimination of the pivot 4, non-zero elements are not newly produced (see step S312).

If i=6, pivot 6 having a minimum degree '1' and a minimum critical path length '14' (=6+6+2) is selected, so that the variable p is set to '6'. By elimination of the pivot 6, non-zero elements are not newly produced (see step S312).

Due to the aforementioned processes, the coefficient matrix of FIG. 9 is subjected to matrix reordering and is transformed to a reordered matrix shown in FIG. 10. A task graph for the reordered matrix is shown in FIG. 11. Herein, a critical path is established among tasks 3, 4, 6 and 2, so that task 2 having a degree '0' is the last task that is executed last in order. In addition, FIG. 11 shows that a critical path length is '14', and a sum of weights is '24'.

Figure 15:
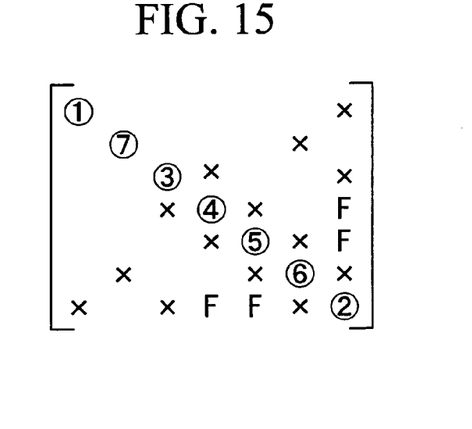
FIG. 15 shows a reordered matrix that is created by reordering elements of the matrix of FIG. 9 in accordance with the conventional matrix reordering process of FIG. 14.
Figure 16:
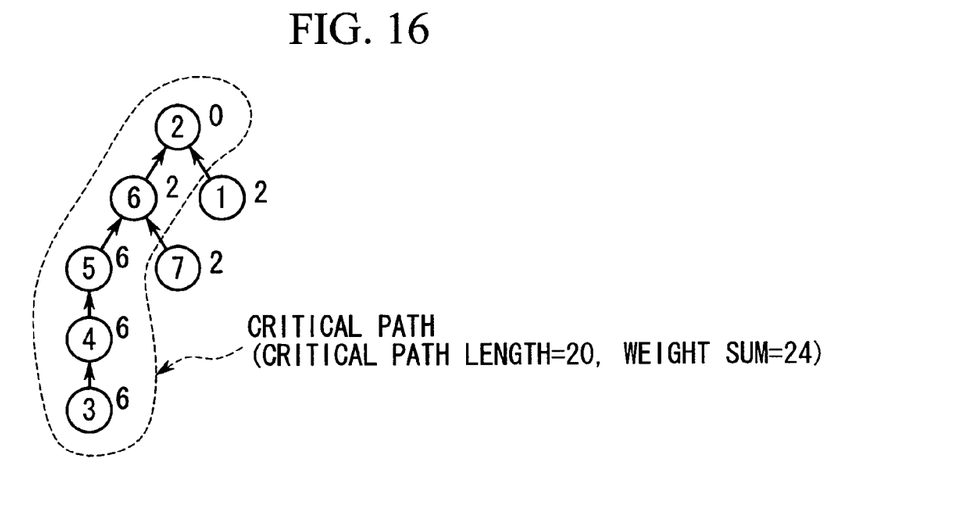
FIG. 16 shows a task graph designating a critical path that is established based on the reordered matrix of FIG. 15.

If the conventional matrix reordering shown in FIG. 14 is applied to the coefficient matrix of FIG. 9, it is possible to create a reordered matrix shown in FIG. 15. FIG. 16 shows a task graph for the reordered matrix of FIG. 15 to establish a critical path among tasks 3, 4, 5, 6 and 2, so that task 2 is the last task that is executed last in order. In addition, FIG. 16 shows that a critical path length is '20', and a sum of weights is '24'.

As described above, the matrix reordering process of step S203 of FIG. 1 is described with reference to FIGS. 2 and 3, wherein the matrix reordering process is performed in consideration of the approximate least degree (=minimum degree+α) and critical path length. As compared with the conventional technique, the present embodiment can considerably reduce a total processing time in parallel processing using multiple processors that operate in parallel with respect to tasks.

Figure 4:
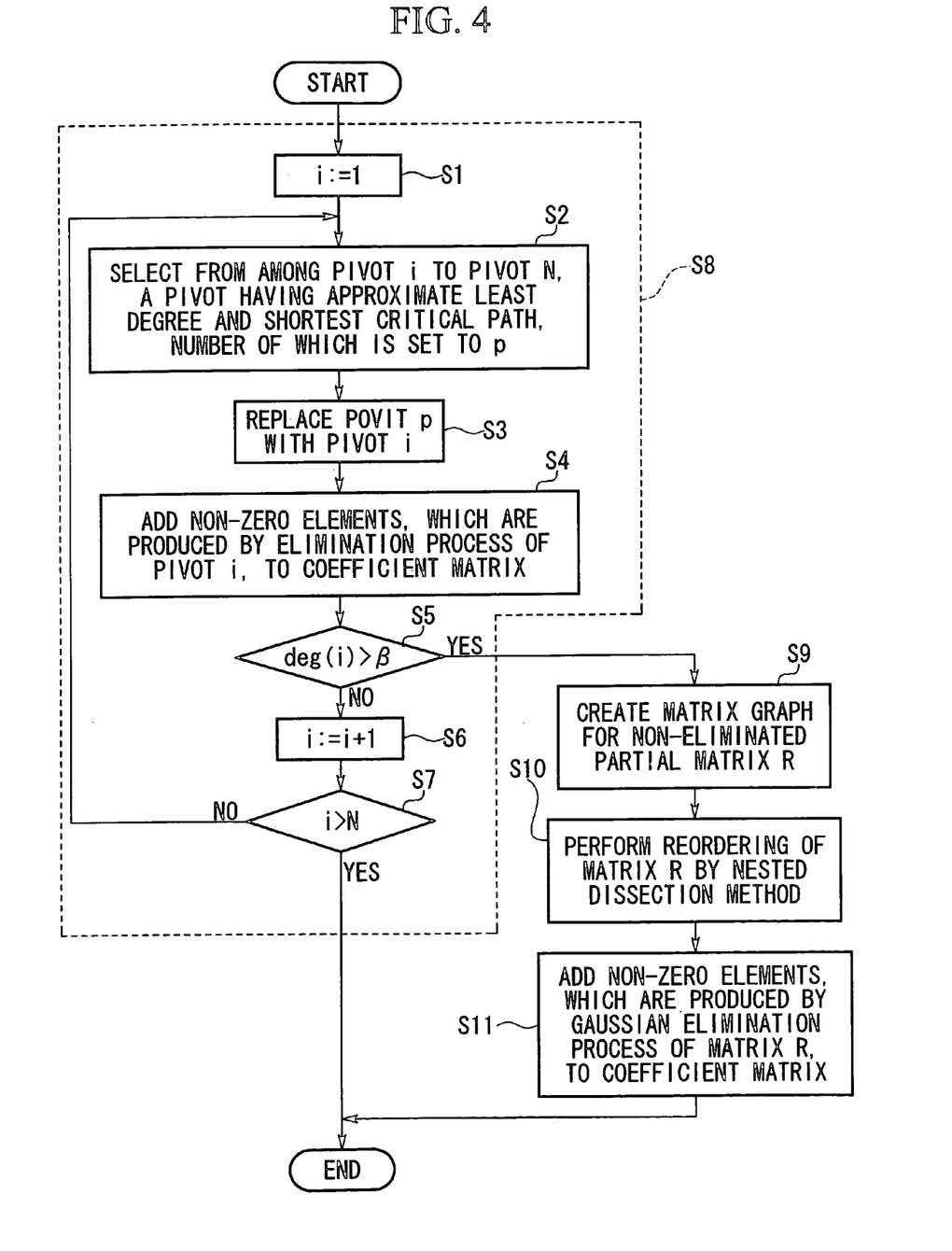
FIG. 4 is a flowchart showing a matrix reordering process that is applied to the electronic circuit simulation method of FIG. 1 in accordance with another embodiment of the invention.

Next, a description will be given with respect to the matrix reordering process (step S203) in accordance with another embodiment with reference to FIG. 4. FIG. 4 shows a flow of steps of the matrix reordering process that is contained in the aforementioned electronic circuit simulation method shown in FIG. 1. Roughly speaking, the matrix reordering process of FIG. 4 is made by a combination of two reordering methods, each of which can be selectively activated. That is, a first reordering method is an approximate minimum degree and minimum critical path method (see step S8) that is similar to the aforementioned method shown in FIG. 2 in which reordering is performed in consideration of the approximate minimum degree and minimum critical path length, and a second reordering method corresponds to one of the conventional matrix reordering methods, namely a nested dissection method (see step S10).

In FIG. 4, step S8 representing the approximate minimum degree and minimum critical path method is configured by seven steps S1 to S7. In step S1, initialization is performed so that a variable i is set to '1'. In step S2, the system selects from among pivots that are not determined in order (or arrangement) in a given coefficient matrix A, a pivot (whose number is p) that has an approximate minimum degree (which is under minimum degree+$\alpha$, where a recommended value for $\alpha$ ranges from '1' to '3') and a minimum critical path. In step S3, replacement is performed between pivots p and i, so that new pivot i is to be determined. In step S4, non-zero elements, which are produced by a Gaussian elimination process of pivot i, are added to the coefficient matrix A. A series of the aforementioned steps are repeatedly performed until a degree of pivot i (deg(i)) exceeds a constant $\beta$ in step S5, or they are repeatedly performed until all pivots are determined in order (or arrangement) in step S7.

As compared with the nested dissection method, the approximate minimum degree and minimum critical path method of step S8 is advantageous because it is possible to further reduce a critical path length when an average degree of pivots contained in the given matrix is approximately under '3'. However, if the average degree becomes greater than '3', the approximate minimum degree and minimum critical path method tends to produce a longer critical path length as compared with the nested dissection method. For this reason, during execution of the approximate minimum degree and minimum critical path method in progress, when a degree of the selected pivot exceeds the constant $\beta$ (where $\beta$ is a natural number), the system automatically changes from the approximate minimum degree and minimum critical path method to the nested dissection method. Incidentally, it is preferable to set a range between '3' and '10' for the constant $\beta$.

If all pivots are not yet determined in order although the matrix reordering is effected on the coefficient matrix A in accordance with the approximate minimum degree and minimum critical path method of step S8, the flow proceeds to step S9 in which a matrix graph is created for a partial matrix R with respect to non-eliminated pivots of the matrix A. In step S10, the matrix graph is used to reorder elements of the partial matrix R in accordance with the nested dissection method. In the nested dissection method, the matrix graph is recursively and repeatedly split into two sections, wherein reordering is performed such that a pivot corresponding to a vertex on a split boundary comes last. Until all pivots are reordered, splitting the matrix graph is recursively and repeatedly performed. In step S11, non-zero elements, which are produced by the Gaussian elimination process of the partial matrix R, are added to the coefficient matrix A in step S11. Thus, it is possible to complete the reordering process of the coefficient matrix A.

Next, a concrete example of the matrix reordering process, which is shown in step S203 of FIG. 1 and details of which are shown in FIG. 4, will be described with reference to FIGS. 6 to 9 and FIGS. 12, 13. As similar to the foregoing embodiment, the matrix reordering process is performed using the electronic circuit of FIG. 8 that is configured by nine electronic elements D1–D9 via seven nodes N1–N7. That is, the matrix reordering process is performed on a coefficient matrix shown in FIG. 9 that is created based on linear simultaneous equations, which express seven variables corresponding to the seven nodes N1–N7 of the electronic circuit. In addition, weight w(i) for task i (i.e., Gaussian elimination process of variable i) is produced by multiplication between '(a degree of pivot i)+1' and 'a degree of pivot i', namely w(i)=(deg(i)+1)·deg(i). The following description is made under the condition where $\alpha$=0, $\beta$=1.

In the approximate minimum degree and minimum critical path method of step S8 shown in FIG. 4, a flow firstly proceeds to step S1 in which a variable i is set to '1'. Herein, pivot i is determined as a pivot whose degree is minimum (where $\alpha$=0). Then, the system searches a pivot whose critical path length is minimum with respect to the pivot i. In the coefficient matrix of FIG. 9, both of pivots 1, 7 have a minimum degree '1' and a minimum critical path length '2'. Within those pivots 1, 7, the system selects pivot 1 whose number is smaller, so that a variable p is set to '1' in step S2. Because of i=p, replacement is not actually performed between pivots p and i. In addition, non-zero elements are not produced by a Gaussian elimination process of pivot 1 (see step S4).

If i=2, the aforementioned processes are repeated on elements of the matrix that are not determined in order. Herein, pivot 7 has a minimum degree and a minimum critical path length, so the variable p is set to '7'. In step S3, replacement is performed between pivots 2 and 7. However, non-zero elements are not produced by a Gaussian elimination process of pivot 7 (see step S4).

If i=3, pivot 3 has a minimum degree '2' and a minimum critical path length '6', so the variable p is set to '3'. By elimination of pivot 3, non-zero elements a(4,7) and a(7,4) are newly produced and are added to the matrix in step S4. Since the degree of pivot 3 is '2' that is greater than $\beta$=1, the matrix reordering process based on the approximate minimum degree and minimum critical path method is ended, so the flow proceeds from step S5 to step S9.

Figure 7:
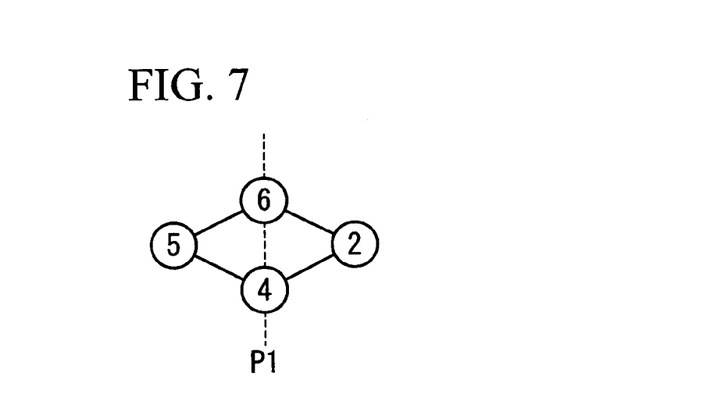
FIG. 7 shows a task graph for a Gaussian elimination process of the matrix of FIG. 6.
Figure 12:
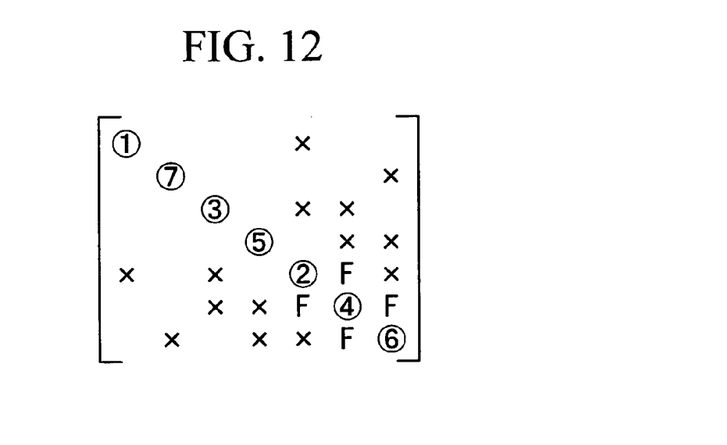
FIG. 12 shows a reordered matrix that is created by reordering elements of the coefficient matrix of FIG. 9 in accordance with the matrix reordering process of FIG. 4.

In the above, a partial matrix R as shown in FIG. 6 is made by pivots of the matrix A that are not determined in order. A matrix graph shown in FIG. 7 is created for the partial matrix R of FIG. 6 in step S9. The nested dissection method splits the matrix graph into two sections, so that the pivots of the partial matrix R are determined in order such that a pivot corresponding to a node on a split boundary comes last. Splitting the matrix graph is recursively and repeatedly performed until all pivots are completely determined in order. In the case of the partial matrix R, it is sufficient to split the matrix graph one time. That is, pivots 4 and 6 correspond to vertices on a split boundary P1, hence, pivots remained in the partial matrix R are reordered as pivots 5, 2, 4 and 6. FIG. 12 shows a reordered matrix that is a final result of the matrix reordering process described above. FIG.

Figure 13:
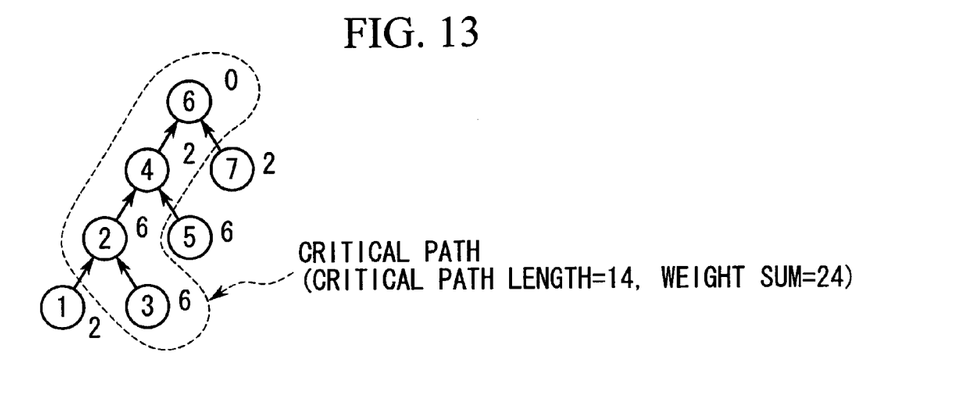
FIG. 13 shows a task graph designating a critical path that is established based on the reordered matrix of FIG. 12.

13 shows a task graph for use in the Gaussian elimination process of the reordered matrix of FIG. 12. Numbers of vertices included in the task graph correspond to numbers of pivots included in the reordered matrix, wherein a critical path is established among pivots 3, 2, 4 and 6. In the task graph, a critical path length is '14'. This proves that the matrix reordering process of FIG. 4 can reduce the critical path length as compared with the conventional matrix reordering process of FIG. 14.

The aforementioned matrix reordering processes of FIGS. 3 and 4 (i.e., step S203 shown in FIG. 1) are described in connection with symmetric matrices. Of course, it is possible to apply the matrix reordering processes to non-symmetric matrices. In that case, it is necessary to introduce three points of modification to the matrix reordering processes of the foregoing embodiments, which will be described below.

Figure 17:
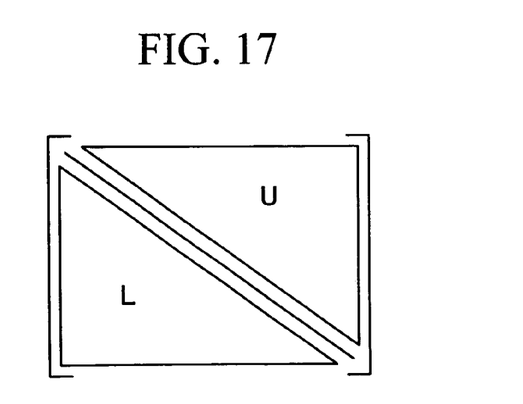
FIG. 17 is a drawing that is used to explain upper and lower triangular matrices that are made by splitting the matrix using a diagonal line.

A first point of modification is commonly applied to both of the matrix reordering processes of FIGS. 2 and 4, namely a necessary condition for selecting a pivot having a minimum critical path length. The aforementioned matrix reordering processes use a condition where a degree deg(i) is under the prescribed value $\alpha$, which is modified to another condition where a parameter $\sqrt{NZLC(i) \cdot NZUR(i)}$ is under the prescribed value $\alpha$. FIG. 17 shows that a matrix is split using a diagonal line into two triangular matrices L and U, both of which do not contain elements on the diagonal line. In the aforementioned parameter, NZLC(i) represents a number of non-zero elements of column i within the lower triangular matrix L, and NZUR(i) represents a number of non-zero elements of row i within the upper triangular matrix U.

Second and third points of modification are exclusively applied to the matrix reordering process of FIG. 4 containing a combination of the approximate minimum degree and minimum critical path method and the nested dissection method, which are selectively used in response to the prescribed switch condition (see step S5). The approximate minimum degree and minimum critical path method shown in FIG. 2 can be applied to non-symmetric matrices by merely introducing the first point of modification. The second point of modification is a change of the switch condition for switching between the approximate minimum degree and minimum critical path method of step S8 and the nested dissection method of step S10. That is, the switch condition of step S5 where deg(i)>$\beta$, is modified using the aforementioned parameter to another condition where $\sqrt{NZLC(i) \cdot NZUR(i)}>\beta$. The third point of modification is a change of application of the nested dissection method of step S10. That is, the nested dissection method is not applied directly to a matrix graph of the non-symmetric partial matrix R but is applied to a matrix graph of the symmetric matrix (R+RT) that is created by transposition of the non-symmetric matrix R. Herein, RT represents a transpose matrix that is created by interchanging rows and columns of the matrix R. By introducing the aforementioned second and third points of modification, it is possible to apply the matrix reordering process of FIG. 4 to non-symmetric matrices.

In the aforementioned modification that is effected on the matrix reordering process of FIG. 4, prior to reordering of elements of a non-symmetric matrix A, it is necessary to create a symmetric matrix (A+AT) by the non-symmetric matrix A and its transpose matrix AT. Then, elements of the symmetric matrix (A+AT) are reordered by the approximate minimum degree and minimum critical path method of step S8 and the nested dissection method of step S10.

Application of the matrix reordering processes of this invention is not necessarily limited to the electronic circuit simulation method. In other words, this invention can be applied to any other types of data processing methods including solving processes for solving linear simultaneous equations by the parallel processing of Gaussian elimination processes.

In short, this invention is improved as compared with the conventional methods because of considerable reduction of processing times for the parallel processing of Gaussian processes in which critical path lengths are sufficiently reduced in task graphs.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A matrix reordering method for reordering elements of a coefficient matrix whose structure corresponds to coefficients of linear simultaneous equations whose solutions are to be produced by parallel processing of processors of a computer in accordance with Gaussian elimination, said matrix reordering method comprising the steps of:

based on a number of non-zero elements included in the coefficient matrix and an accumulative processing time of the Gaussian elimination of the coefficient matrix, determining a first combination of row and column and a second combination of row and column, which are selected from among rows and columns of the coefficient matrix; and performing replacement of elements between the first combination of row and column and the second combination of row and column within the coefficient matrix using the coefficient matrix for solving the linear simultaneous equations.

2. A matrix reordering method for reordering elements of a coefficient matrix whose structure corresponds to coefficients of linear simultaneous equations whose solutions are to be produced by parallel processing of processors of a computer in accordance with Gaussian elimination, said matrix reordering method comprising the steps of:

based on a number of non-zero elements included in the coefficient matrix and lengths of critical paths created by the Gaussian elimination of the coefficient matrix, determining a first combination of row and column and a second combination of row and column, which are selected from among rows and columns of the coefficient matrix; and performing replacement of elements between the first combination of row and column and the second combination of row and column within the coefficient matrix using the coefficient matrix for solving the linear simultaneous equations.

3. A matrix reordering method according to claim 1 or 2 further comprising the step of:

in accordance with a prescribed condition, selectively performing either the replacement of elements between the first and second combinations of rows and columns or secondary replacement of elements between a third combination of row and column and a fourth combination of row and column, which are selected based on symmetry of the coefficient matrix.

4. A matrix reordering method according to claim 3 further comprising the step of:

creating a symmetric coefficient matrix by transposition of a non-symmetric coefficient matrix that is given as the coefficient matrix, so that the secondary replacement is performed on elements of the symmetric coefficient matrix between the third and fourth combinations of rows and columns, which are selected based on symmetry of the symmetric coefficient matrix.

5. A matrix reordering apparatus for reordering elements of a coefficient matrix whose structure corresponds to coefficients of linear simultaneous equations whose solutions are to be produced by parallel processing of processors of a computer in accordance with Gaussian elimination, said matrix reordering apparatus comprising:

a determining means for based on a number of non-zero elements included in the coefficient matrix and an accumulative processing time of the Gaussian elimination of the coefficient matrix, determining a first combination of row and column and a second combination of row and column, which are selected from among rows and columns of the coefficient matrix; and a replacing means for performing replacement of elements between the first combination of row and column and the second combination of row and column within the coefficient matrix wherein the apparatus is operable to use the coefficient matrix for solving the linear simultaneous equations.

6. A matrix reordering apparatus for reordering elements of a coefficient matrix whose structure corresponds to coefficients of linear simultaneous equations whose solutions are to be produced by parallel processing of processors of a computer in accordance with Gaussian elimination, said matrix reordering apparatus comprising:

a determining means for based on a number of non-zero elements included in the coefficient matrix and lengths of critical paths created by the Gaussian elimination of the coefficient matrix, determining a first combination of row and column and a second combination of row and column, which are selected from among rows and columns of the coefficient matrix; and a replacing means for performing replacement of elements between the first combination of row and column and the second combination of row and column within the coefficient matrix wherein the apparatus is operable to use the coefficient matrix for solving the linear simultaneous equations.

7. An electronic circuit simulation method using matrix reordering for reordering elements of a coefficient matrix that represents electronic elements of a given electronic circuit by linear simultaneous equations whose solutions are to be produced by parallel processing of processors of a computer in accordance with Gaussian elimination, said electronic circuit simulation method comprising the steps of:

based on a number of non-zero elements included in the coefficient matrix and an accumulative processing time of the Gaussian elimination of the coefficient matrix, determining a first combination of row and column and a second combination of row and column, which are selected from among rows and columns of the coefficient matrix; and performing replacement of elements between the first combination of row and column and the second combination of row and column within the coefficient matrix using the coefficient matrix for solving the linear simultaneous equations.

8. An electronic circuit simulation method using matrix reordering for reordering elements of a coefficient matrix that represents electronic elements of a given electronic circuit by linear simultaneous equations whose solutions are to be produced by parallel processing of processors of a computer in accordance with Gaussian elimination, said electronic circuit simulation method comprising the steps of:

based on a number of non-zero elements included in the coefficient matrix and lengths of critical paths created by the Gaussian elimination of the coefficient matrix, determining a first combination of row and column and a second combination of row and column, which are selected from among rows and columns of the coefficient matrix; and performing replacement of elements between the first combination of row and column and the second combination of row and column within the coefficient matrix using the coefficient matrix for solving the linear simultaneous equations.

9. An electronic circuit simulation method according to claim 7 or 8 further comprising the step of:

in accordance with a prescribed condition, selectively performing either the replacement of elements between the first and second combinations of rows and columns or secondary replacement of elements between a third combination of row and column and a fourth combination of row and column, which are selected based on symmetry of the coefficient matrix.

10. An electronic circuit simulation method according to claim 9 further comprising the step of:

creating a symmetric coefficient matrix by transposition of a non-symmetric coefficient matrix that is given as the coefficient matrix, so that the secondary replacement is performed on elements of the symmetric coefficient matrix between the third and fourth combinations of rows and columns, which are selected based on symmetry of the symmetric coefficient matrix.

11. An electronic circuit simulation apparatus using matrix reordering for reordering elements of a coefficient matrix that represents electronic elements of a given electronic circuit by linear simultaneous equations whose solutions are to be produced by parallel processing of processors of a computer in accordance with Gaussian elimination, said electronic circuit simulation apparatus comprising:

a determining means for based on a number of non-zero elements included in the coefficient matrix and an accumulative processing time of the Gaussian elimination of the coefficient matrix, determining a first combination of row and column and a second combination of row and column, which are selected from among rows and columns of the coefficient matrix; and a replacing means for performing replacement of elements between the first combination of row and column and the second combination of row and column within the coefficient matrix wherein the apparatus is operable to use the coefficient matrix for solving the linear simultaneous equations.

12. An electronic circuit simulation apparatus using matrix reordering for reordering elements of a coefficient matrix that represents electronic elements of a given electronic circuit by linear simultaneous equations whose solutions are to be produced by parallel processing of processors of a computer in accordance with Gaussian elimination, said electronic circuit simulation apparatus comprising the steps of:

a determining means for based on a number of non-zero elements included in the coefficient matrix and lengths of critical paths created by the Gaussian elimination of the coefficient matrix, determining a first combination of row and column and a second combination of row and column, which are selected from among rows and columns of the coefficient matrix; and a replacing means for performing replacement of elements between the first combination of row and column and the second combination of row and column within the coefficient matrix wherein the apparatus is operable to use the coefficient matrix for solving the linear simultaneous equations.

13. A matrix reordering method for reordering elements of a coefficient matrix created based on coefficients of linear simultaneous equations whose solutions are to be produced by parallel processing of processors of a computer in accordance with Gaussian elimination, said matrix reordering method comprising the steps of:

selecting from among pivots included in the coefficient matrix a first pivot whose degree corresponding to a number of non-zero elements is under a threshold;

selecting from among the pivots included in the coefficient matrix a second pivot whose critical path length is minimum;

performing replacement of elements between the first pivot and the second pivot within the coefficient matrix; and adding new non-zero elements, which are newly produced by the Gaussian elimination of the first pivot, to the coefficient matrix using the coefficient matrix for solving the linear simultaneous equations.

14. A matrix reordering method according to claim 13 further comprising the step of:

performing reordering of a partial matrix whose elements are not eliminated and are selected from among the elements of the coefficient matrix in accordance with a nested dissection method, so that non-zero elements, which are newly produced by the Gaussian elimination of the partial matrix, are added to the coefficient matrix.

15. A matrix reordering method according to claim 14 further comprising the step of:

creating a symmetric coefficient matrix by transposition of a non-symmetric coefficient matrix that is given as the coefficient matrix, so that the reordering is performed on the symmetric coefficient matrix.

16. A matrix reordering method according to claim 14 wherein the reordering is started if a degree or a parameter of the first pivot is under a threshold.

* * * * *